US009344129B2

(12) United States Patent  
LaBelle et al.

(10) Patent No.: US 9,344,129 B2  
(45) Date of Patent: May 17, 2016

(54) CIRCUITS AND METHODS FOR PROVIDING A CONTROL VOLTAGE AND IMPROVING SWITCH PERFORMANCE IN RADIO FREQUENCY (RF) MODULES

(75) Inventors: Michael S. LaBelle, Phoenix, AZ (US); Shane Moore, Gilbert, AZ (US); Jamel Benbrik, Broomfield, CO (US); Michael B Thomas, Chandler, AZ (US)

(73) Assignee: RF Micro Devices, Inc., Greensboro, NJ (US)

( * ) Notice: Subject to any disclaimer, the term of this patent is extended or adjusted under 35 U.S.C. 154(b) by 1011 days.

(21) Appl. No.: 13/444,390

(22) Filed: Apr. 11, 2012

(65) Prior Publication Data

US 2012/0263258 A1 Oct. 18, 2012

Related U.S. Application Data

(60) Provisional application No. 61/473,985, filed on Apr. 11, 2011.

(51) Int. Cl.
*H04B 1/16* (2006.01)
*H04L 27/04* (2006.01)
*H04B 1/04* (2006.01)

(52) U.S. Cl.
CPC ............ *H04B 1/1615* (2013.01); *H04B 1/1607* (2013.01); *H04B 2001/0416* (2013.01); *H04L 27/04* (2013.01)

(58) Field of Classification Search
None
See application file for complete search history.

(56) References Cited

U.S. PATENT DOCUMENTS

| 4,680,553 | A | * | 7/1987 | Kimura | H03G 7/001 327/104 |
|---|---|---|---|---|---|
| 6,617,962 | B1 | * | 9/2003 | Horwitz | G06K 7/10297 340/10.4 |
| 7,193,459 | B1 | | 3/2007 | Epperson et al. | |
| 7,263,337 | B2 | | 8/2007 | Struble | |
| 2005/0113035 | A1 | * | 5/2005 | Kyongyop | H01Q 1/38 455/90.3 |
| 2005/0178845 | A1 | * | 8/2005 | Desfontaines | G06K 19/0723 235/492 |
| 2008/0136603 | A1 | * | 6/2008 | Choi | G06K 19/0723 340/10.33 |
| 2009/0015356 | A1 | * | 1/2009 | Chen | H02H 3/027 335/7 |
| 2011/0150496 | A1 | * | 6/2011 | Feher | H04M 11/04 398/140 |

OTHER PUBLICATIONS

Numata, K. et al., "A High-Power Handling GSM Switch IC With New Adaptive-Control-Voltage-Generator Circuit Scheme," 2003 IEEE Radio Frequency Integrated Circuits (RFIC) Symposium, Philadelphia, PA, Jun. 8, 2003, pp. 233-236.

* cited by examiner

*Primary Examiner* — Leon-Viet Nguyen
(74) *Attorney, Agent, or Firm* — Withrow & Terranova, P.L.L.C.

(57) ABSTRACT

An apparatus comprises at least one transmit amplifier and rectification circuitry located in the at least one transmit amplifier, which is configured to receive a RF signal and provide a rectified voltage, which is selectably added to a voltage supplied by a battery to generate a DC voltage supply signal that is a function of RF power level. A controller is configured to select between providing the VBAT or the VSupply signal to a transmit switch depending on one or more of a logic state and a mode of operation. An alternate apparatus comprises a charge pump circuit configured to quickly raise a voltage supplied to it and store the output voltage on a capacitor and then either shift a first frequency provided by a charge pump oscillator to a lower second frequency or turn off a charge pump clock to maintain a voltage on the capacitor during a transmit mode.

22 Claims, 8 Drawing Sheets

CIRCUITS AND METHODS FOR PROVIDING A CONTROL VOLTAGE AND IMPROVING SWITCH PERFORMANCE IN RADIO FREQUENCY (RF) MODULES

RELATED APPLICATION

This application claims benefit to U.S. Provisional Patent Application No. 61/473,985, filed on Apr. 11, 2011, entitled "Mode Dependent Switch Control Architecture," which is incorporated herein by reference.

FIELD OF THE INVENTION

The present application relates to Radio Frequency (RF) modules, and in particular to providing a control voltage and improving the switch performance in Radio Frequency (RF) modules, especially during transmit modes under certain conditions.

BACKGROUND OF THE INVENTION

Circuits for boosting DC voltage using a RF input signal are known. In some of these circuits, a rectifier technique is used to generate the boost voltage using the RF input signal. For example, see "A High-Power Handling GSM Switch IC With New Adaptive-Control-Voltage-Generator Circuit Scheme" by Keiichi Numata et. Al., 2003 IEEE Radio Frequency Integrated Circuits (RFIC) Symposium, Philadelphia, Pa., Jun. 8, 2003. In addition, U.S. Pat. No. 7,263,337 discloses a RF switch that is allegedly capable of operating in a highly linear manner in response to a low control voltage. U.S. Pat. No. 7,263,337 discloses a bias circuit that includes a rectifier having an input, an output and a DC control voltage input, wherein the rectifier is configured to produce the rectifier output, while providing a substantially high input impedance at the rectifier input, a rectified voltage from an alternating input signal applied at the rectifier input; and a bias extractor having an extractor input, a control voltage input and an extractor output, coupled to the rectifier output, and being configured to produce at the extractor output a DC voltage that is greater in magnitude than the DC control voltage input. Thus, in this patent, the RF energy is rectified by a diode and added to a control signal to the switch. These known methods are useful for a limited range of module conditions, but have some issues when considering a broader range of operating conditions.

The most notable issue with U.S. Pat. No. 7,263,337 is that there is no immunity to the switch control voltage that is generated if a Voltage Standing Wave Ratio (VSWR) mismatch is applied to the module. The amount of variation in the switch control voltage will be dependent on the location of the rectification circuit and could potentially diminish its effectiveness if the switch control voltage drops below a voltage supplied by a battery (VBAT). Another issue with the implementation in U.S. Pat. No. 7,263,337 is that the rectified voltage is "hardwired" to the switch control voltage.

Thus, it would be beneficial to have a transmit module that has improved system level harmonic performance under mismatch load conditions at switch antenna ports.

SUMMARY OF THE INVENTION

In one embodiment, an apparatus is disclosed for providing a control voltage and improving the switch performance in Radio Frequency (RF) modules. The apparatus comprises at least one transmit amplifier and rectification circuitry located in the at least one transmit amplifie. The rectification circuitry is configured to receive a RF signal and provide a rectified voltage, which is selectably added to a voltage supplied by a battery (VBAT) to generate a DC voltage supply signal (VSupply signal) that is a function of RF power level. The apparatus also comprises a controller configured to receive the VSupply signal from the rectification circuitry, wherein the controller selects between providing the VBAT or the VSupply signal to a transmit switch depending on one or more of a logic state and a mode of operation.

In an exemplary method of operating the disclosed apparatus, a RF signal is coupled into the rectification circuit located in the at least one transmit (Tx) amplifier. The rectified voltage is added to a voltage supplied by a battery (VBAT) to generate a DC voltage supply signal that is a function of RF power level. At low RF drive power, the DC voltage supply signal may be slightly below VBAT, while at higher power levels the DC voltage supply signal may be greater than VBAT. The DC voltage supply signal is then routed to the controller, where it can be selected as a signal to route to the Tx switch, depending on a logic state and a mode of operation. In this manner, a mode dependent switch control architecture and method is disclosed for providing a control voltage and improving the switch performance in Radio Frequency (RF) modules, especially during transmit modes under certain conditions.

This method is particularly well suited to, but not limited to, for continuous wave applications.

In another embodiment, an apparatus is disclosed for providing a control voltage and improving the switch performance in Radio Frequency (RF) modules, especially during transmit modes under certain conditions. The apparatus comprises a charge pump circuit configured to raise a voltage supplied to the charge pump circuit to an output charge pump voltage, wherein the charge pump circuit includes a charge pump clock and a charge pump oscillator configured to provide a plurality of oscillator frequencies to the charge pump circuit. The apparatus also comprises at least one capacitor configured to hold the output charge pump voltage. The charge pump circuit is configured to quickly raise the voltage level on the capacitor and then either shift a first frequency provided by the charge pump oscillator to a lower second frequency or turn off the charge pump clock to maintain a voltage level on the capacitor during a transmit mode. In this manner, the charge pump circuit is used to quickly raise the voltage level on the least one capacitor and then shift the charge pump oscillator frequency to a much lower frequency or turn off the oscillator clock to maintain the voltage level on the capacitor during transmit mode to reduce the coupling of noise spurs from the charge pump onto the receive band.

A higher switch control voltage is desirable in systems that require high linearity switch receive paths and improved transmit harmonic suppression under variable load and battery supply conditions. By using this circuit and technique, a higher switch control voltage is achieved without compromising noise power performance in an isolation limited environment such as integrating a charge with a power amplifier. This technique will allow a charge pump to be integrated into transmit modules, thereby allowing improved system level harmonic performance under mismatch load conditions at switch antenna ports. This method will work for both pulsed and continuous wave applications, though it is particularly suited for pulsed applications.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
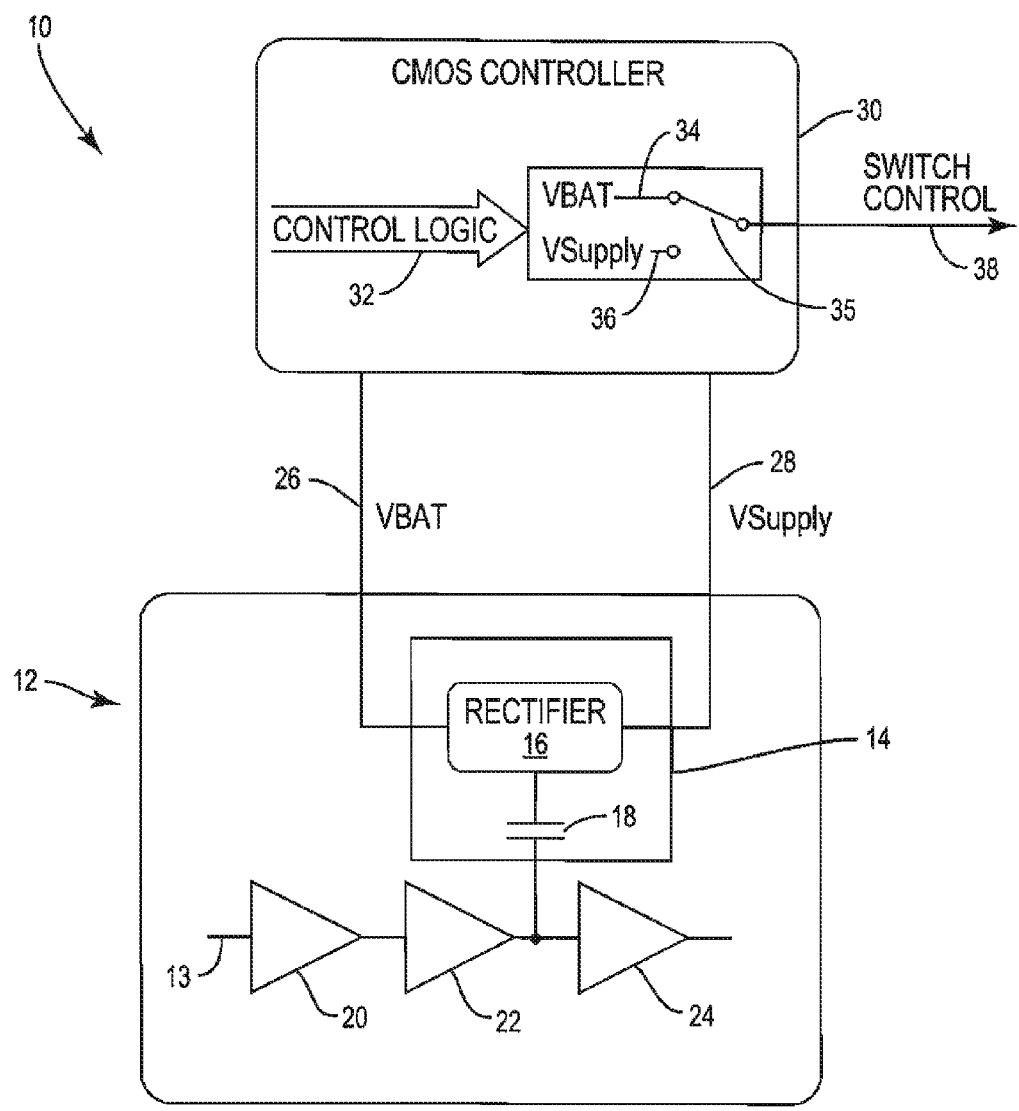
FIG. 1 is a mode dependent switch architecture for generating a DC supply voltage that is a function of RF power level according to an exemplary embodiment.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In one embodiment, an apparatus is disclosed for providing a control voltage and improving the switch performance in Radio Frequency (RF) modules. The apparatus comprises at least one transmit amplifier and rectification circuitry located in the at least one transmit amplifie. The rectification circuitry is configured to receive a RF signal and provide a rectified voltage, which is selectably added to a voltage supplied by a battery (VBAT) to generate a DC voltage supply signal (VSupply signal) that is a function of RF power level. The apparatus also comprises a controller configured to receive the VSupply signal from the rectification circuitry, wherein the controller selects between providing the VBAT or the VSupply signal to a transmit switch depending on one or more of a logic state and a mode of operation.

In an exemplary method of operating the disclosed apparatus, a RF signal is coupled into the rectification circuit located in the at least one transmit (Tx) amplifier. The rectified voltage is added to a voltage supplied by a battery (VBAT) to generate a DC voltage supply signal that is a function of RF power level. At low RF drive power, the DC voltage supply signal may be slightly below VBAT, while at higher power levels the DC voltage supply signal may be greater than VBAT. The DC voltage supply signal is then routed to the controller, where it can be selected as a signal to route to the Tx switch, depending on a logic state and a mode of operation. In this manner, a mode dependent switch control architecture and method is disclosed for providing a control voltage and improving the switch performance in Radio Frequency (RF) modules, especially during transmit modes under certain conditions.

In one embodiment, the DC voltage supply signal is routed to a CMOS control integrated circuit (IC) where it can be selected as a signal to route to a transmit switch, depending on logic state and mode of operation. In one embodiment, under a first mode of operation, such as Gaussian Mode Shift Keying (GMSK), the generated supply signal or VBAT is routed to control the switch dependent upon logic state. In another embodiment, under a second mode of operation, such as 8 Phase Shift Keying (8PSK), VBAT is routed to control the switch.

The goal of this architecture is to improve RxTx switch performance during Tx modes under low VBAT conditions or into a mismatch for RF transmit modules.

As discussed above, U.S. Pat. No. 7,263,337 discloses an approach where the RF energy is rectified by a diode and added to a control signal to the switch. This method is useful for a limited range of module conditions, but has some issues when considering a broader range of operating conditions that the present architecture and method tries to address.

The most notable issue with the implementation in U.S. Pat. No. 7,263,337 is that there is no immunity to the switch control voltage that is generated if a VSWR mismatch is applied to the module. The amount of variation in the switch control voltage will be dependent on the location of the rectification circuit and could potentially diminish its effectiveness if the voltage drops below VBAT. In the embodiment disclosed herein, the rectification circuit is placed in the transmit amplifier itself, which provides some level of isolation (buffering) to the VSWR effects and as a result, the generated voltage is more tolerant of VSWR.

In one embodiment, as shown in FIG. 1, mode dependent switch control architecture 10 is disclosed. The mode dependent switch control architecture may include a transmit amplifier 12 (Tx amplifier 12) and a rectification circuitry 14. In one embodiment, as shown in FIG. 1, the rectification circuitry 14 may comprise a rectifier 16 and a capacitor 18. In one embodiment, the Tx amplifier 12 may be a three stage amplifier comprising amplifiers 20, 22, and 24 (Q1, Q2, and Q3). In the embodiment shown in FIG. 1, the rectification circuitry 14 is placed between amplifiers 22 and 24 (i.e., between Q2 and Q3). However, in other embodiments, the rectification circuit may be placed between amplifiers 20 and 22 (i.e., between Q1 and Q2), or elsewhere in the Tx amplifier 12. The rectification circuitry 14 may be placed in any known type of amplifier, including but not limited to a Gallium Arsenide (GaAs) Tx amplifier. In the present system and method shown in FIG. 1, the rectification circuitry 14 is placed in the Tx amplifier 12 and a voltage from a battery VBAT 26 is run through the rectification circuitry 14, which provides some level of isolation (buffering) to the VSWR effects and as a result, the generated voltage will be more tolerant to VSWR. A RF signal 13 is coupled into the rectification circuitry 14 located in the Tx amplifier 12. The rectified voltage is added to a voltage supplied by a battery (VBAT 26)

to generate a DC supply signal (VSupply 28) that is a function of RF power level. At low RF drive power, the supply signal Vsupply 28 is slightly below VBAT 26, while at higher power levels, the supply signal Vsupply 28 is greater than VBAT 26.

Another issue with the implementation in U.S. Pat. No. 7,263,337 is that the rectified voltage is "hardwired" to the switch control voltage. There is no mention of a method to control the voltage level that is sent to the switch. In contrast, in one embodiment described herein, as shown in FIG. 1, the rectified voltage from the rectification circuitry 14 is routed to a controller 30. In one embodiment, the controller 30 is a CMOS control integrated circuit (IC). The controller 30 may include control logic 32 and will be able to selectively route a voltage to the Tx switch depending on the module state. The control logic 32 in controller 30 can selectively control a gate 35 to choose between VBAT signal 34 and Vsupply signal 36 being routed as switch control signal 38 to the Tx switch depending on the mode of operation.

For example, if the module is in an 8PSK (EDGE) mode, the voltage generated in the rectification circuitry 14 will follow the modulated waveform. This signal may not be an ideal signal to control the switch with. In the present implementation, the controller 30 can be programmed to route VBAT 26 to gate 35 such that VBAT signal 34 is provided to the Tx switch instead of the rectified voltage Vsupply 36 for this mode of operation.

The controller 30 could also be programmed via control logic 32 to switch to VBAT signal 34 as the switch control signal 38 under other conditions as well. At lower power levels, the higher level control signals are not needed and this feature could be turned off.

The rectification circuitry 14 can be placed in almost any known GaAs process. The rectification circuitry 14 can be placed in the Tx amplifier 12 between either Q1 and Q2 or Q2 and Q3 of a 3-stage amplifier. In alternate embodiments, the controller 30 can be implemented in any standard process. In one embodiment, the controller 30 is located within the same module as the Tx amplifier 12. In another embodiment, the controller 30 can be a separate piece of silicon.

In an exemplary method of operating the disclosed mode dependent switch control architecture 10, a RF signal 13 is coupled into the rectification circuitry 14 located in the transmit (Tx) amplifier 12. The rectified voltage is added to a voltage supplied by a battery (VBAT) to generate a DC voltage supply signal that is a function of RF power level. At low RF drive power, the DC voltage supply signal may be slightly below VBAT, while at higher power levels the DC voltage supply signal may be greater than VBAT. The DC voltage supply signal is then routed to the controller 30, where it can be selected as a signal to route to the Tx switch, depending on a logic state and a mode of operation. In this manner, a mode dependent switch control architecture and method is disclosed for providing a control voltage and improving the switch performance in Radio Frequency (RF) modules, especially during transmit modes under certain conditions.

Figure 2:
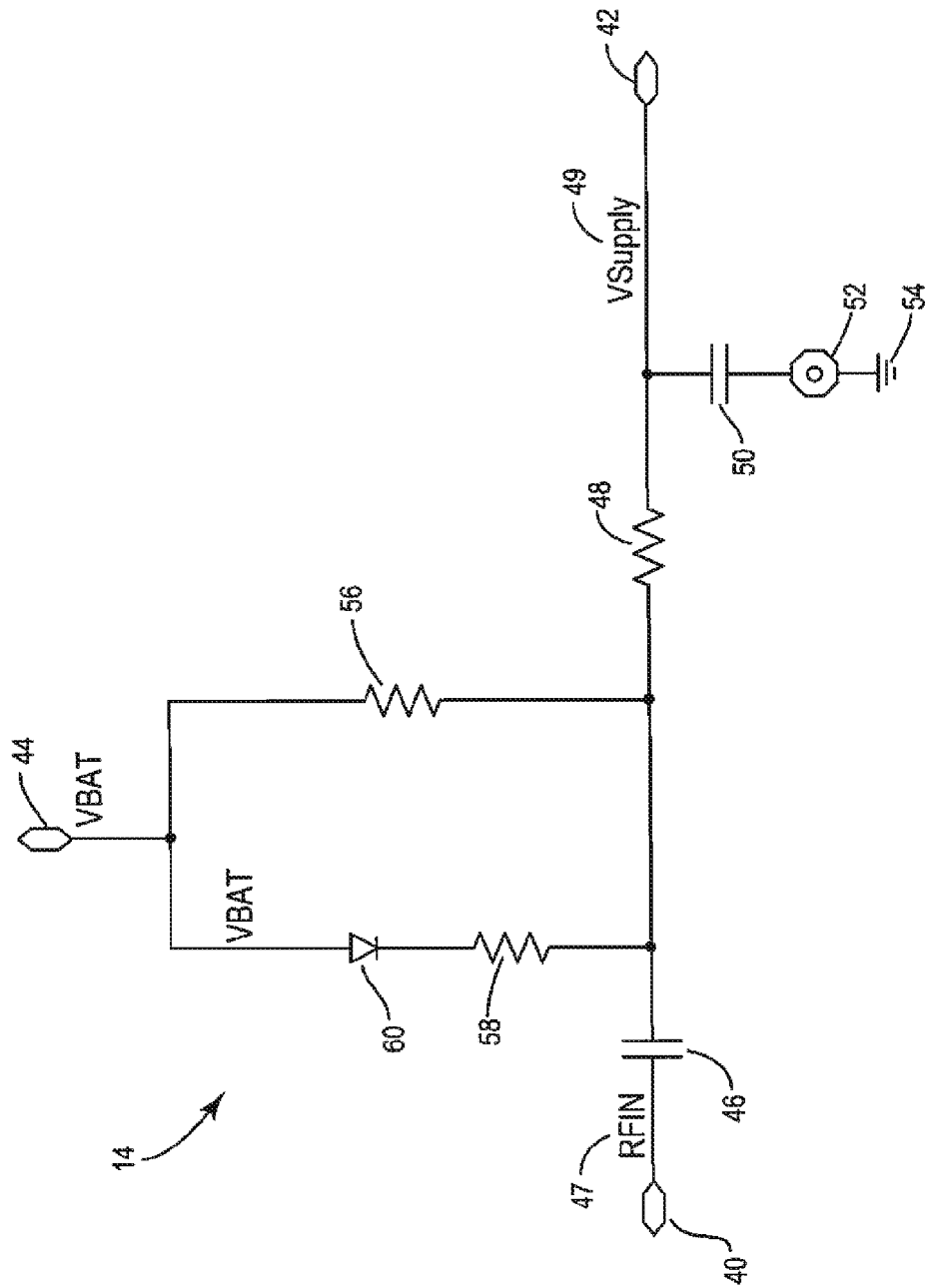
FIG. 2 is an exemplary rectification circuit that may be used in the exemplary mode dependent switch architecture of FIG. 1.

FIG. 2 is an exemplary rectification circuit that may be used in the exemplary mode dependent switch architecture of FIG. 1. The rectification circuit 14 of FIG. 1 could be implemented using the circuit shown in FIG. 2. This embodiment includes ports 40, 42, and 44; capacitors 46 and 50; and resistors 48, 56, and 58, as shown in FIG. 2. The capacitor 46 may be placed between the port 40 and the resistor 58. A diode element 60 may be between the resistor 58 and the port 44. The capacitor 50 may be grounded to ground 54 through via 52. A RF input signal 47 may be provided through the port 40. The VBAT (such as VBAT 26 from FIG. 1) may be supplied through the port 44. The RF input signal 47 is supplied through the port 40 and may be added to the VBAT from port 44 to generate a DC supply signal (VSupply 49) that is a function of RF power level. At low RF drive power, the DC supply signal Vsupply 49 is slightly below VBAT, while at higher power levels, the DC supply signal Vsupply 49 is greater than VBAT. Then, depending on the mode of operation, as discussed above, the CMOS IC 30 may include control logic 32 and will be able to selectively route a voltage to the switch depending on the module state.

The capacitors 46 and 50 and the resistors 48, 56, and 58 may be of any appropriate value. In one embodiment, the capacitor 46 may be 3000 fF and capacitor 50 may be 5.0 pF. In one embodiment, the resistor 48 may be 3000 ohms, the resistor 56 may be 3500 ohms, and the resistor 58 may be 150 ohms.

Figure 3:
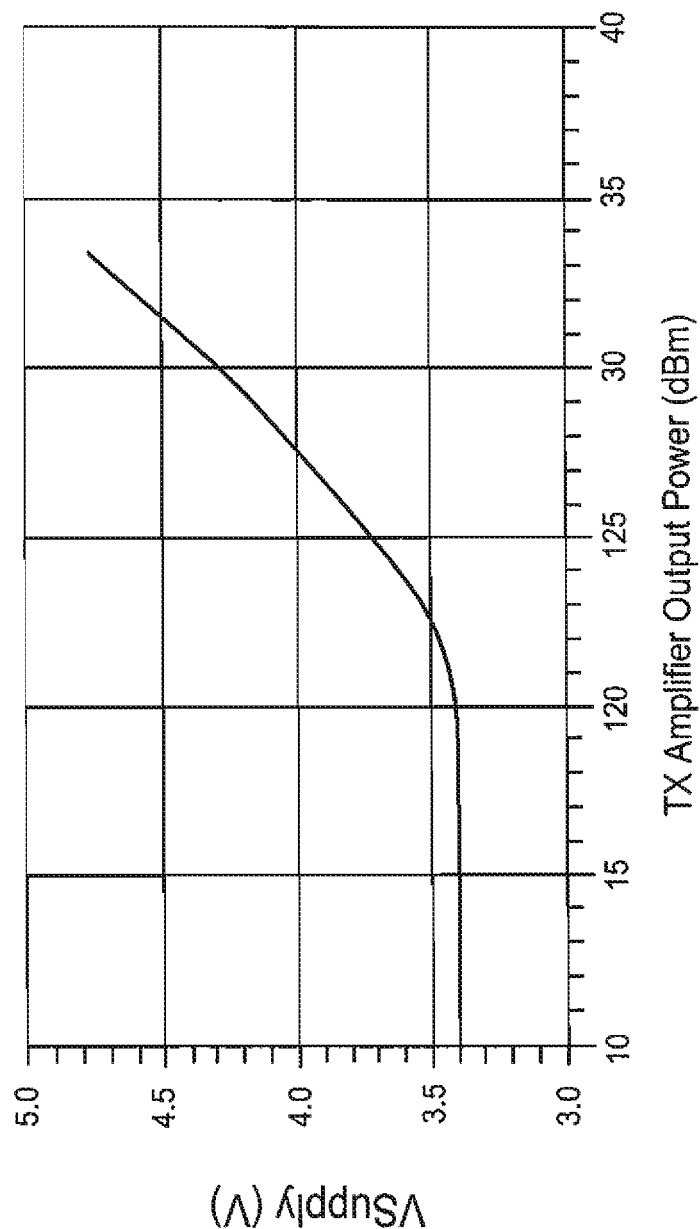
FIG. 3 is a graph illustrating simulated voltage supply versus the transmit amplifier output power for an exemplary embodiment.

Referring back to FIG. 1, the voltage generated by the rectification circuitry 14 is added to the voltage supplied by a battery (VBAT 26) to generate a DC supply signal (VSupply 28) that is a function of RF power level. This is illustrated by FIG. 3, which is a graph illustrating simulated voltage supply versus the transmit amplifier output power for an exemplary embodiment. In this manner, the disclosed architecture and methods provide some level of isolation (buffering) to the VSWR effects and as a result, the generated voltage will be more tolerant to VSWR.

Figure 4:
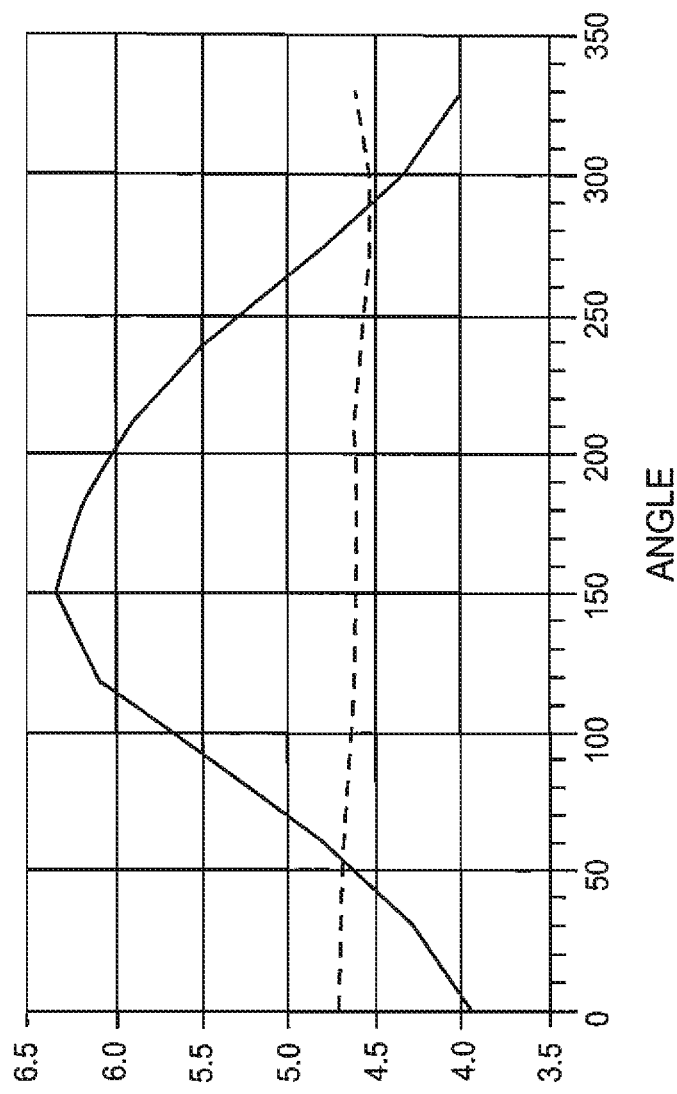
FIG. 4 is a graph comparing the supply voltage into a 4:1 VSWR according to an exemplary embodiment versus the prior art implementation.

This can be seen by looking at FIG. 4, which is a graph comparing the supply voltage into a 4:1 VSWR according to an exemplary embodiment described herein versus the prior art implementation (U.S. Pat. No. 7,263,337).

In an alternate embodiment, charge pumps (CP) can be used to generate a voltage higher than VBAT and are an effective approach to control the switch for Rx modes. However, the clock frequency of the CP is a concern for the Tx mode of operation and becomes a major design challenge to isolate the CP clock noise from mixing with the F0 in the Tx amplifier. If the clock noise becomes mixed with F0, the module may have issues passing system level (ETSI) spectrum and noise power requirements. In particular, when using CPs in a RF tranmsit module, noise spurs may be a problem. One way to address these issues is to use the architecture as shown in FIG. 5.

In another embodiment, an apparatus is disclosed for providing a control voltage and improving the switch performance in Radio Frequency (RF) modules, especially during transmit modes under certain conditions. The apparatus comprises a charge pump circuit configured to raise a voltage supplied to the charge pump circuit to an output charge pump voltage, wherein the charge pump circuit includes a charge pump clock and a charge pump oscillator configured to provide a plurality of oscillator frequencies to the charge pump circuit. The apparatus also comprises at least one capacitor configured to hold the output charge pump voltage. The charge pump circuit is configured to quickly raise the voltage level on the capacitor and then either shift a first frequency provided by the charge pump oscillator to a lower second frequency or turn off the charge pump clock to maintain a voltage level on the capacitor during a transmit mode. In this manner, the charge pump circuit is used to quickly raise the voltage level on the least one capacitor and then shift the charge pump oscillator frequency to a much lower frequency or turn off the oscillator clock to maintain the voltage level on the capacitor during transmit mode to reduce the coupling of noise spurs from the charge pump onto the receive band.

A higher switch control voltage is desirable in systems that require high linearity switch receive paths and improved transmit harmonic suppression under variable load and battery supply conditions. By using this circuit and technique, a higher switch control voltage is achieved without compromising noise power performance in an isolation limited environment such as a integrating a charge with a power amplifier. This technique will allow a charge pump to be integrated into transmit modules, thereby allowing improved system level harmonic performance under mismatch load conditions at switch antenna ports.

Figure 5:
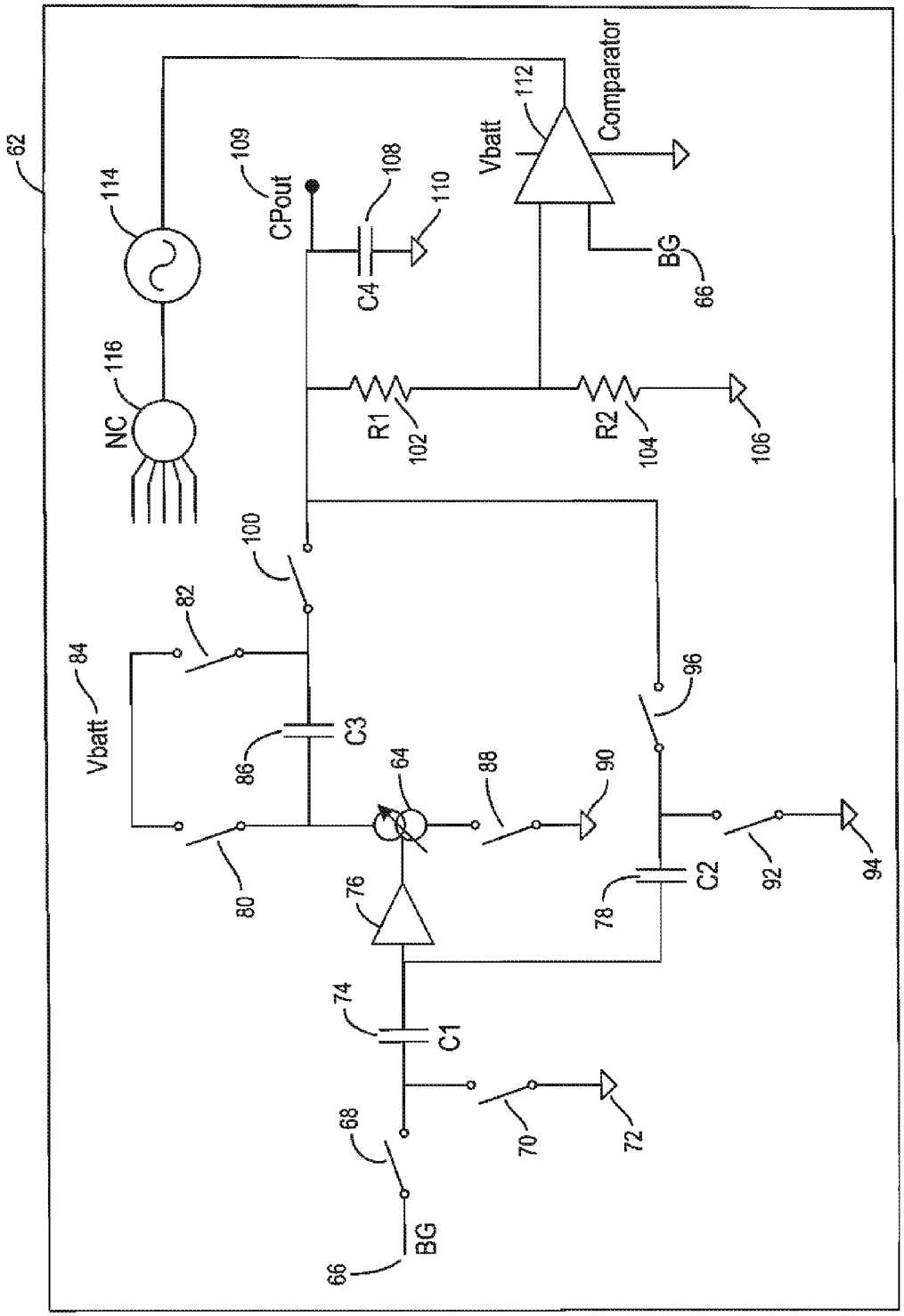
FIG. 5 illustrates an alternate embodiment of a circuit designed to boost the supply voltage in RF transmit modules while reducing noise spurs when using charge pumps in a RF transmit module.
Figure 6:
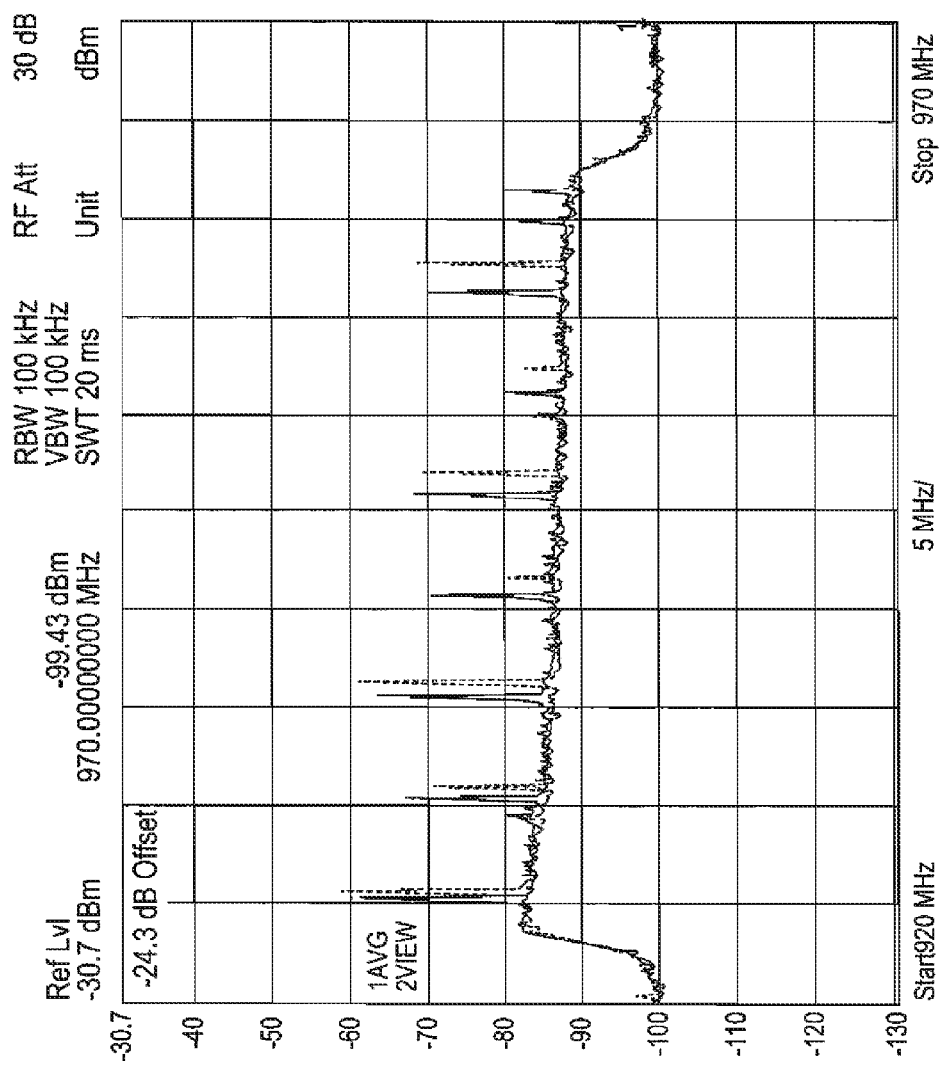
FIG. 6 is a graph illustrating undesirable noise spurs that may occur when using prior art charge pump clocks in a RF transmit module.

FIG. 5 illustrates an alternate embodiment of a circuit designed to boost the voltage battery in RF transmit modules while reducing noise spurs when using charge pumps in a RF transmit module. The core of the circuit is a charge pump. In the embodiment of FIG. 5, the charge pump is a regulated charge pump with switch capacitors feedback. However, in other embodiments, the circuit can also be implemented on any other charge pump architecture such as a doubler, negative charge pump, etc. . . . . . Every charge pump uses a clock in order to boost the voltage battery (or a reference voltage). Unfortunately, the clock creates undesirable spurs in the TX/RX spectrum of communication systems (see FIG. 6). FIG. 6 is a graph illustrating undesirable noise spurs that may occur when using prior art charge pump clocks in a RF transmit module.

Referring back to FIG. 5, a charge pump circuit 62 is disclosed. The charge pump circuit 62 comprises at least one controlled current source 64. A reference bandgap 66 is selectively provided to the charge pump circuit 62 via switches 68 and 70 coupled to a supply voltage 72. The charge pump circuit 62 also may comprise capacitors 74 and 78 and diode 76 in order to rectify a voltage supplied when switches 80 and 82 are closed (VBAT 84). A capacitor 86 may also be included as part of the charge pump circuit 62. The controlled current source 64 may be selectively coupled through switch 88 to a supply voltage 90. The charge pump portion of the charge pump circuit 62 may be selectively coupled through switch 92 to a supply voltage 94. The charge pump portion of the charge pump circuit 62 may also be selectively coupled through switches 96 and 100 to a resistance divider comprising resistors 102 and 104 grounded through 106. A capacitor 108 grounded through 110 is designed to hold the voltage output by the charge pump (CPout 109). The value of capacitor 108 may be determined by the load current of the charge pump and the duration of a burst. In one embodiment, the load current may be 100 microamperes (100 uA) and the maximum burst duration may be 2.5 milliseconds (ms) (five consecutive 500 microsecond (usec) bursts). In this embodiment, the capacitor 108 may be selected to have a value of between 220 nanofarads (nF) and 440 nF for a 10 megaHertz (mHz) charge pump.

The charge pump circuit 62 may also include a comparator 112, a charge pump oscillator 114, and a charge pump clock 116. The charge pump oscillator 114 is capable of providing a plurality of oscillator frequencies for the charge pump. In one embodiment described herein, when trying to provide a higher control voltage for a RF transmit or receive module, particularly in variable load and battery supply conditions, a method is disclosed that includes turning off the charge pump clock 116 during the burst to avoid the undesirable noise spurs. In one embodiment, after the charge pump clock 116 is turned on, the charge pump has to boost the battery voltage to 5V in less than 10 us before the start of the TX burst. Once the 5V output voltage is reached, the charge pump clock 116 is turned off. The comparator 112 is used to sense the output voltage of the charge pump (CPout 109) through the resistance divider comprising the resistors 102 and 104. The divided output voltage is compared to a bandgap reference 66 (see FIG. 5).

Once the comparator 112 triggers, it turns off the charge pump clock 116. The 5V output voltage is held by the capacitor 108. The value of capacitor 108 may be determined by the load current and the duration of the burst. In an exemplary embodiment, the load current is 100 uA (gate current of the PHEMT switches) and the maximum burst duration is 2.5 ms (5 consecutive 500 us bursts). A value for capacitor 108 between 220 nF and 440 nF may be used for a 10 MHz charge pump in one embodiment.

In another embodiment, when the comparator 112 is triggered, instead of turning off the charge pump clock 116, the charge pump oscillator 114 may be controllably adjusted to provide a much lower oscillator frequency to maintain the voltage level on the capacitor 108 during transmit mode to reduce the coupling of the noise spurs from the charge pump onto the receive band. By using the charge pump circuit 62 to quickly raise the voltage level on the holding capacitor 108 and then shifting the charge pump oscillator frequency to a much lower frequency or turning off the charge pump clock 116, the voltage level on the capacitor 108 during transmit mode is maintained to reduce the coupling of noise spurs from the charge pump onto the receive band.

Figure 7:
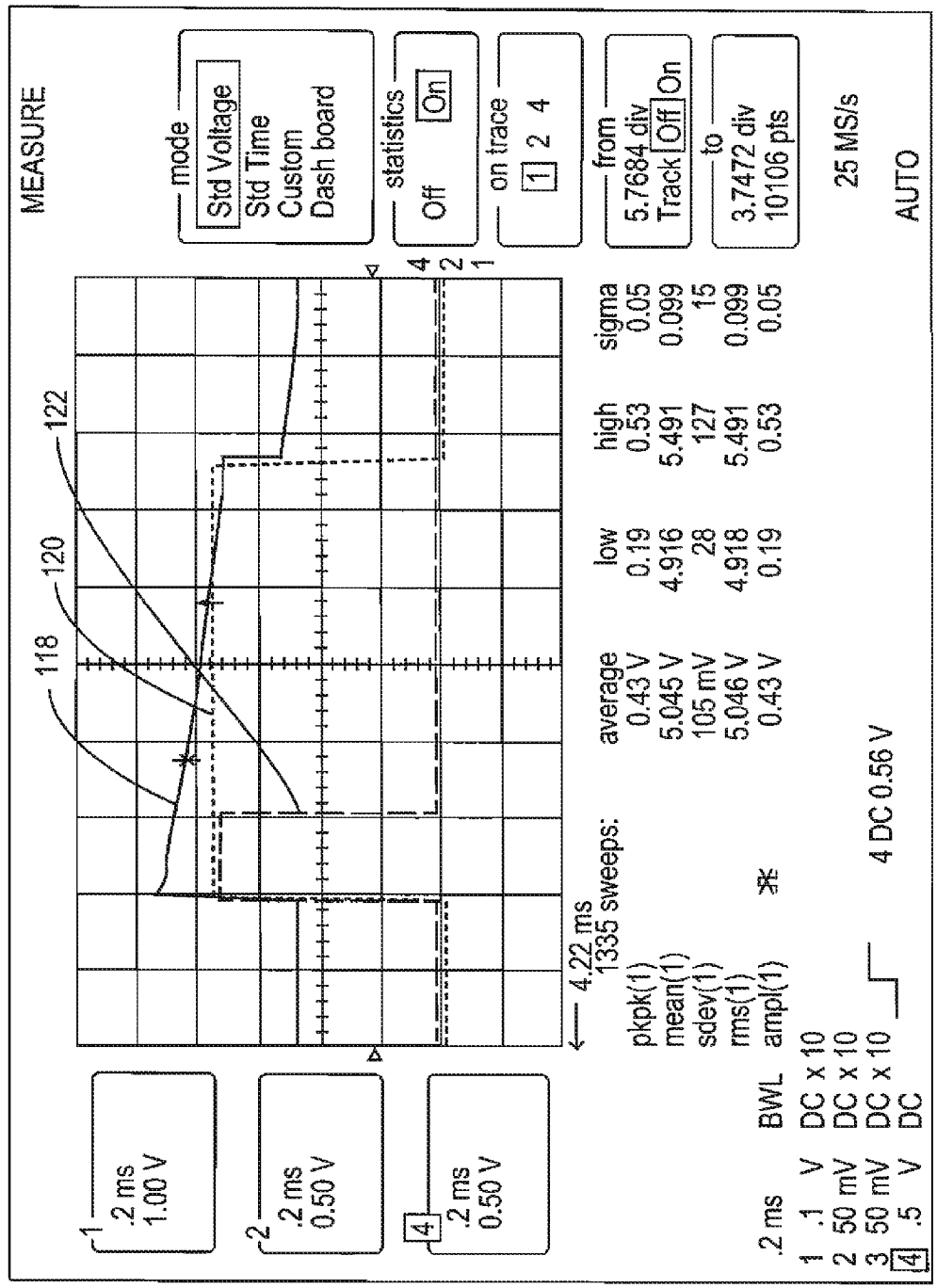
FIG. 7 is a lab measurement illustrating the input and output voltage resulting from using the exemplary circuit in FIG. 5.

FIG. 7 is a lab measurement of this technique using the architecture shown in FIG. 5. The curve labeled 118 is the 5V output voltage, the curve labeled 120 is the Vramp input voltage and the curve labeled 122 is a synchronization signal. As described above, the 5V output voltage (118) starts at the battery voltage (2.9V<Vbat<5V) and it is then boosted to 5V in less than 10 microseconds (us). After that, the charge pump clock 116 is turned off and the output voltage (118) decays linearly during the burst.

Figure 8:
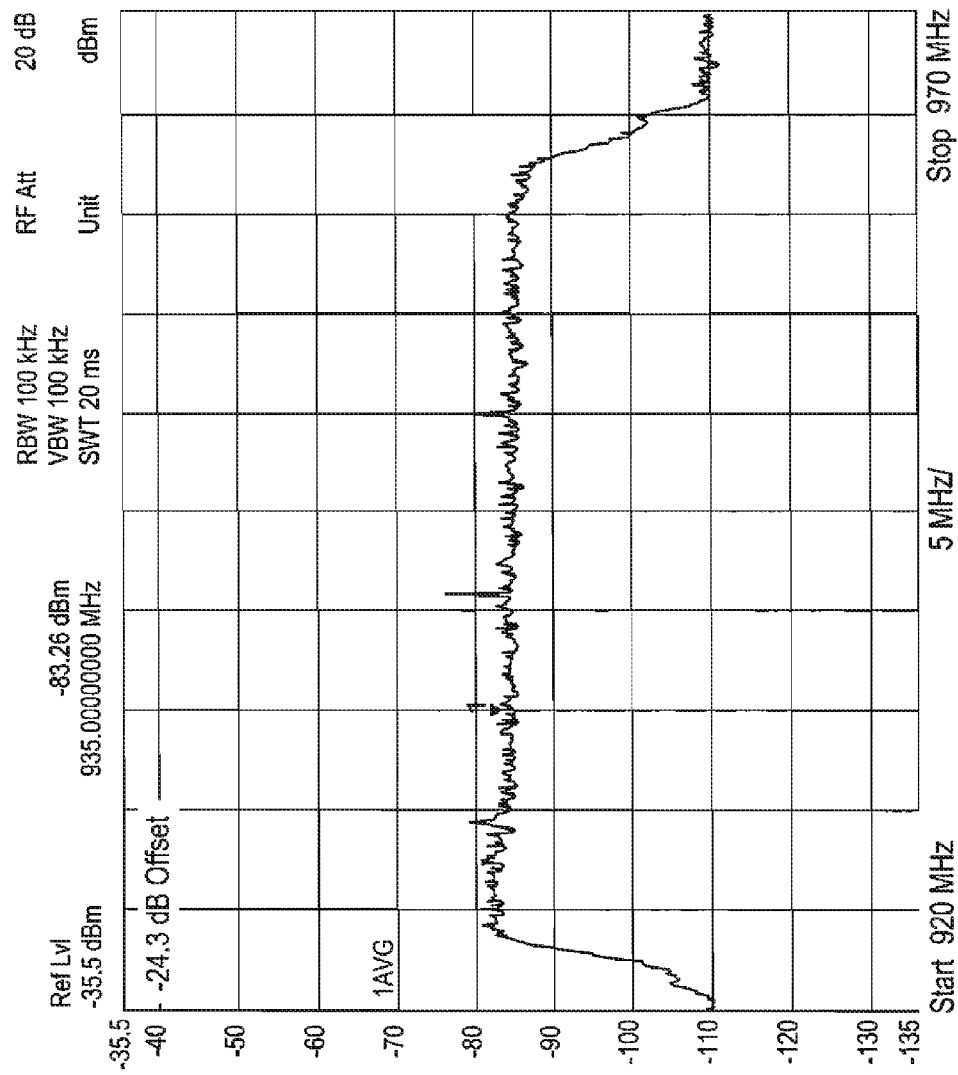
FIG. 8 is a graph illustrating an exemplary transmit spectrum that results when using the exemplary circuit shown in FIG. 5, showing that the noise spurs are suppressed.

FIG. 8 is a graph illustrating an exemplary transmit spectrum that results when using the exemplary circuit shown in FIG. 5, showing that the noise spurs are suppressed. The noisy spurs are totally suppressed and the other switch parameters (linearity, harmonics, etc.) are not degraded.

Those skilled in the art will recognize improvements and modifications to the preferred embodiments of the present invention. All such improvements and modifications are considered within the scope of the concepts disclosed herein and the claims that follow.

What is claimed is:

1. An apparatus for providing a control voltage and improving switch performance in Radio Frequency (RF) modules, comprising:
    at least one transmit amplifier;
    rectification circuitry located in the at least one transmit amplifier and configured to receive a RF signal and provide a rectified voltage, which is selectably added to a voltage supplied by a battery (VBAT) to generate a DC voltage supply signal (VSupply signal) that is a function of RF power level; and
    a controller configured to receive the VSupply signal from the rectification circuitry, wherein the controller selects between providing the VBAT or the VSupply signal to a transmit switch depending on one or more of a logic state and a mode of operation.

2. The apparatus of claim 1, wherein for a first mode of operation, the controller selects between routing the VSupply signal or the VBAT to control the transmit switch depending upon the logic state.

3. The apparatus of claim 2, wherein the first mode of operation is Gaussian Mode Shift Keying (GMSK).

4. The apparatus of claim 1, wherein for a second mode of operation, the controller routes the VBAT to control the transmit switch.

5. The apparatus of claim 4, wherein the second mode of operation is 8 Phase Shift Keying (8PSK).

6. The apparatus of claim 1, wherein the controller is located in a module that also includes the transmit amplifier.

7. The apparatus of claim 1, wherein the rectification circuitry comprises a rectifier and a capacitor.

8. The apparatus of claim 1, wherein the at least one transmit amplifier is a three stage amplifier.

9. The apparatus of claim 8, wherein the rectification circuitry is located between a first stage and a second stage of the three stage amplifier.

10. The apparatus of claim 8, wherein the rectification circuitry is located between a second stage and a third stage of the three stage amplifier.

11. The apparatus of claim 1, wherein the at least one transmit amplifier is a Gallium Arsenide (GaAs) transmit amplifier.

12. A method of providing a control voltage and improving the switch performance comprising:
    coupling a RF signal into rectification circuitry located in at least one transmit amplifier;
    adding a rectified voltage output from the rectification circuitry to a voltage supplied by a battery (VBAT) to generate a DC voltage supply signal (Vsupply signal) that is a function of RF power level;
    routing the Vsupply signal to a controller;
    selecting either the VBAT or the VSupply signal as a selected voltage for routing to a transmit switch, wherein the selecting depends on a logic state and a mode of operation; and
    routing the selected voltage to the transmit switch.

13. The method of claim 12, wherein for a first mode of operation, the selecting depends upon the logic state.

14. The method of claim 13, wherein the first mode of operation is Gaussian Mode Shift Keying (GMSK).

15. The method of claim 12, wherein for a second mode of operation, the VBAT is selected to control the transmit switch.

16. The method of claim 15, wherein the second mode of operation is 8 Phase Shift Keying (8PSK).

17. The method of claim 12, further comprising providing the controller in a module that also includes the transmit amplifier.

18. The method of claim 12, wherein the at least one transmit amplifier is a three stage amplifier.

19. The method of claim 18, further comprising providing the rectification circuitry between a first stage and a second stage of the three stage amplifier.

20. The method of claim 18, further comprising providing the rectification circuitry between a second stage and a third stage of the three stage amplifier.

21. The apparatus of claim 1, wherein the controller is configured to select between providing the VBAT or the VSupply signal to a transmit switch depending on the logic state and the mode of operation.

22. An apparatus for providing a control voltage and improving switch performance in Radio Frequency (RF) modules, comprising:
    at least one transmit amplifier;
    rectification circuitry located in the at least one transmit amplifier and configured to receive a RF signal and provide a rectified voltage, which is selectably added to a voltage supplied by a battery (VBAT) to generate a DC voltage supply signal (VSupply signal) that is a function of RF power level; and
    a controller configured to receive the VSupply signal from the rectification circuitry, wherein the controller selects between providing the VBAT or the VSupply signal to a transmit switch depending on a mode of operation.

\* \* \* \* \*

UNITED STATES PATENT AND TRADEMARK OFFICE
CERTIFICATE OF CORRECTION

PATENT NO. : 9,344,129 B2
APPLICATION NO. : 13/444390
DATED : May 17, 2016
INVENTOR(S) : Michael S. LaBelle et al.

It is certified that error appears in the above-identified patent and that said Letters Patent is hereby corrected as shown below:

Title Page Item (73), replace "Greensboro, NJ" with --Greensboro, NC--.

Signed and Sealed this
Nineteenth Day of July, 2016

Michelle K. Lee
*Director of the United States Patent and Trademark Office*